B. F. SMITH.
Animal-Traps.
No. 143,727. Patented Oct. 14, 1873.
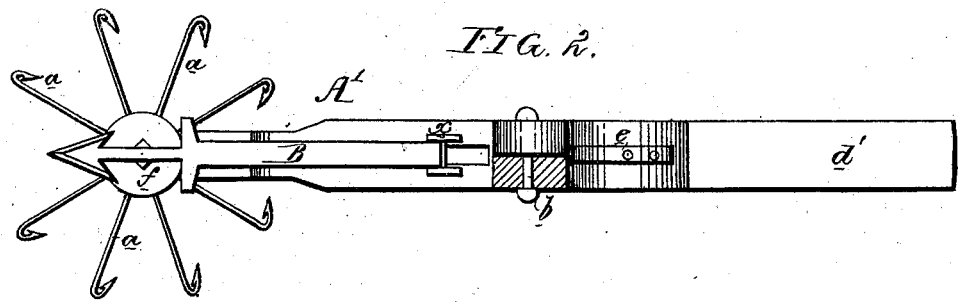
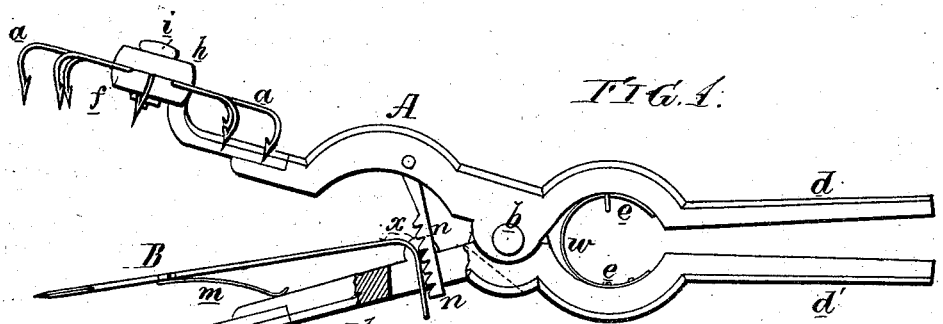
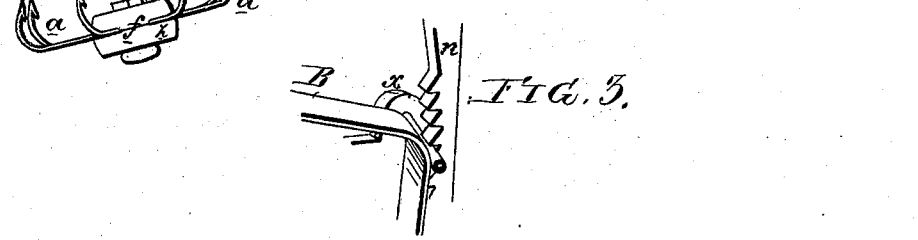
Witnesses, Thomas M. Swain
Hubert Howson
Benjamin F. Smith
by his Attys,
Howson and Son

UNITED STATES PATENT OFFICE.

BENJAMIN F. SMITH, OF PHILADELPHIA, PENNSYLVANIA.

IMPROVEMENT IN ANIMAL-TRAPS.

Specification forming part of Letters Patent No. 143,727, dated October 14, 1873; application filed July 30, 1873.

*To all whom it may concern:*

Be it known that I, BENJAMIN F. SMITH, of the city and county of Philadelphia, State of Pennsylvania, have invented an Improved Animal-Trap, of which the following is a specification:

The object of my invention is to securely entrap fish and other animals by spring-jaws A and A', armed with barbed hooks $a\ a$, as shown in the side view, Figure 1, and sectional plan, Fig. 2, of the accompanying drawing, the jaws, when opened, being retained by a baited tongue or trigger, B, and being closed by a spring when the tongue is disturbed by an animal, the struggles of which will tend to increase the hold of the barbed hooks. The jaws are hinged together by a pin, $b$, and are provided with arms $d\ d'$, for the ready opening of the jaws when the trap has to be set. The spring $w$, for closing the jaws when the latter are released, is, in the present instance, confined in cavities $e\ e$, formed in the arms $d\ d'$, and acts in a manner too clearly explained by the drawing to need description. The barbed hooks $a$ are arranged in a circle on each arm, their butts being confined by a set-screw, bolt, or rivet, between a disk, $f$, forming the termination of the arm, and a washer, $h$. The tongue B, to the outer barbed end of which the bait has to be attached, is hinged at $x$ to the jaw A', and has a spring, $m$, bearing against the said arm, and a projection adapted to any of the notches in an arm, $n$, hung to the jaw A, the spring $m$ tending to maintain the projection in one of the notches, and consequently to keep the jaws open, as shown in the sketch, Fig. 3. On depressing the tongue, however, its projection will be freed from the notch in the arm $n$, and the jaws will be released, with the result above referred to.

The trap may be attached to a line and used for catching fish, or it may be used as a trap for catching rats and other animals.

I claim as my invention—

1. The spring-jaws A and A', armed with hooks $a$, in combination with the spring tongue or trigger B and notched arm $n$.

2. The combination of the jaws A and A' and their barbed hooks with the arms $d$ and $d'$ and spring $w$.

3. The series of barbed hooks $a$, confined to the jaws in the manner described.

In testimony whereof I have signed my name to this specification in the presence of two subscribing witnesses.

BENJN. F. SMITH.

Witnesses:
 WM. A. STEEL,
 HUBERT HOWSON.